United States Patent [19]

Nahm

[11] Patent Number: 5,421,628
[45] Date of Patent: Jun. 6, 1995

[54] WATER-REPELLENT SHIELD FOR AUTOMOBILE SIDE MIRROR

[76] Inventor: Hyong K. Nahm, 864-18 Manchon 3-Dong, Soosung-ku, Taegu, Rep. of Korea

[21] Appl. No.: 187,555
[22] Filed: Jan. 28, 1994
[51] Int. Cl.⁶ ............................................. B60R 1/06
[52] U.S. Cl. ............................................ 296/1.1; 359/507
[58] Field of Search ................. 296/1.1, 95.1, 97.6, 296/97.8; 359/507, 511

[56] References Cited

U.S. PATENT DOCUMENTS

| | | | |
|---|---|---|---|
| 2,622,481 | 12/1952 | Triphahn | 359/507 |
| 2,649,839 | 8/1953 | Condon | 359/507 |
| 4,558,899 | 12/1985 | Chu et al. | 296/97.8 |
| 4,577,929 | 3/1986 | Guillen | 359/507 X |
| 4,620,777 | 11/1986 | Nu | 359/507 |
| 4,668,058 | 5/1987 | Wright | 359/507 |
| 4,690,451 | 9/1987 | Killar | 296/97.6 |
| 4,750,824 | 6/1988 | Soumenis | 359/507 |
| 5,165,745 | 11/1992 | Liao | 296/1.1 |

FOREIGN PATENT DOCUMENTS

| | | | |
|---|---|---|---|
| 155133 | 9/1982 | Japan | 359/511 |
| 202949 | 9/1986 | Japan | 359/507 |
| 796105 | 6/1958 | United Kingdom | 359/507 |

Primary Examiner—Dean J. Kramer

[57] ABSTRACT

The present invention relates to a water-repellant shield for an automobile side mirror, which includes a water-repellant cover and an extension cover or a collapsible extension cover extending from the water-repellant covering whereby the extension cover or collapsible extension cover can effectively protect the side mirror from water such as rain.

6 Claims, 2 Drawing Sheets

WATER-REPELLENT SHIELD FOR AUTOMOBILE SIDE MIRROR

BACKGROUND OF THE INVENTION

1. Field of the Invention

The present invention relates to a water-repellant shield for an automobile side mirror and more particularly, to a water-repellant shield for covering an automobile side mirror, which includes a water-repellant cover and an extension cover extending from the water-repellant cover for effectively covering and protecting the automobile side mirror against water such as rain on rainy days so as to keep the side mirror clean.

2. Description of Related Art

In general, automobile side mirrors are disposed at both sides of the auto body in the vicinity of the driver's seat, so that it is very difficult to safely clean while driving on rainy days. However, there is no device known in the art for protecting the side mirror from water.

SUMMARY OF THE INVENTION

Accordingly, it is an object of the present invention to provide a water-repellant shield for an automobile side mirror, which eliminates the above problems encountered with the conventional automobile side mirrors.

Another object of the present invention is to provide a water-repellant shield for an automobile side mirror, which includes a water-repellant cover and an extension cover extending from the water-repellant cover for protecting the automobile side mirror from water such as rain.

A further object of the present invention is to provide a water-repellant cover and collapsible extension cover extending from the water repellant cover so as to extend the collapsible extension cover during rainy days.

Still another object of the present invention is to provide a water-repellant shield for an automobile side mirror, which is simple in structure, inexpensive to manufacture, durable in use, and refined in appearance.

Briefly, the present invention relates to a water-repellant shield for an automobile side mirror, which includes a water-repellant cover and an extension cover or a collapsible extension cover extending from the water-repellant cover, whereby the extension cover or collapsible extension cover can effectively protect the side mirror from water such as rain.

Other objects and further scope of applicability of the present invention will become apparent from the detailed description given hereinafter. It should be understood, however, that the detail description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
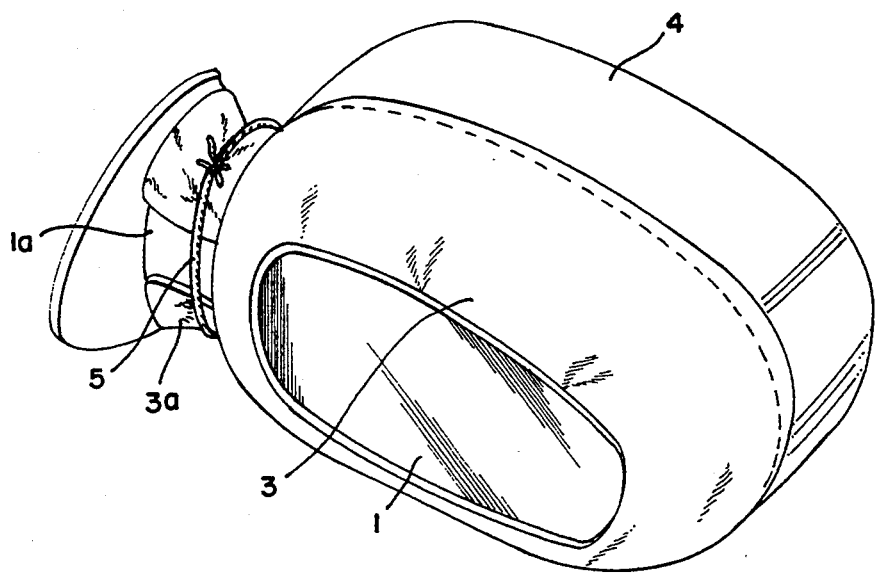
FIG. 1 is a rear perspective view of the water-repellant shield for an automobile side mirror according to the present invention.
Figure 2:
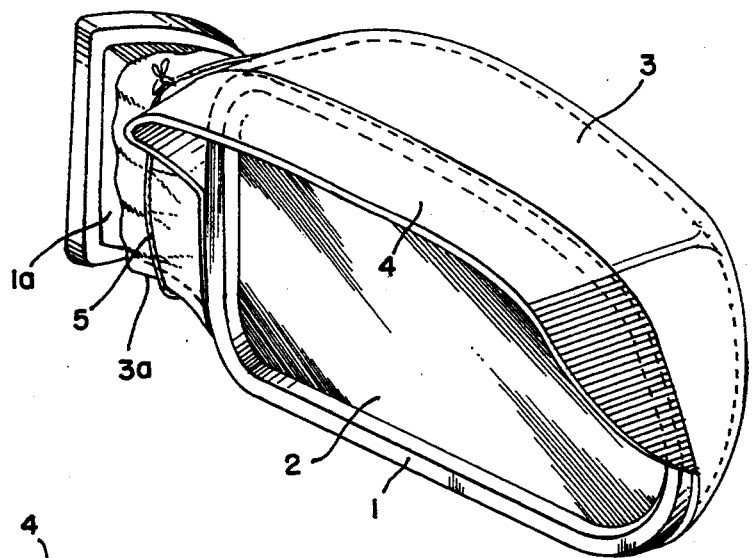
FIG. 2 is a front perspective view of the water-repellant shield for an automobile side mirror according to the present invention.
Figure 3:
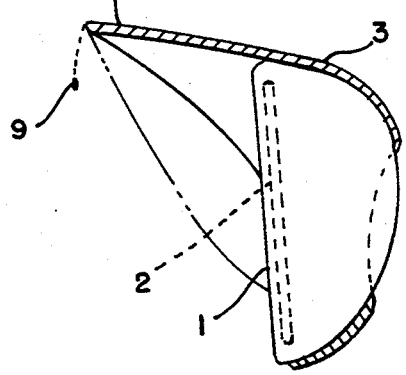
FIG. 3 is a cross-sectional view of FIG. 2.

Referring now in detail to the drawings for the purpose of illustrating preferred embodiments of the present invention, the water-repellant shield for an automobile side mirror as shown in FIGS. 1, 2, and 3, comprises an automobile side mirror body 1, an automobile side mirror 2, a water-repellant cover 3, and an extension cover 4 from a water-repellant cover 3 for effectively covering the automobile side mirror 2 against water 9 such as rain so as to keep the side mirror 2 clean. The water-repellant cover 3 and its extension cover 4 are made of synthetic resin or synthetic rubber which has tension and is waterproof.

As shown in FIGS. 1 and 2, the water-repellant cover 3 is provided with a collapsible mouthpiece 3a for covering a side mirror neck 1a of the side mirror body 1 so as to easily attach the water-repellant cover 3 to the side mirror body by an attaching member such as a string 5 or an adhesive (not shown). During a non-rainy day, the water-repellant cover 3 having the extension cover 4 can be separated from the side mirror body 1.

Figure 4:
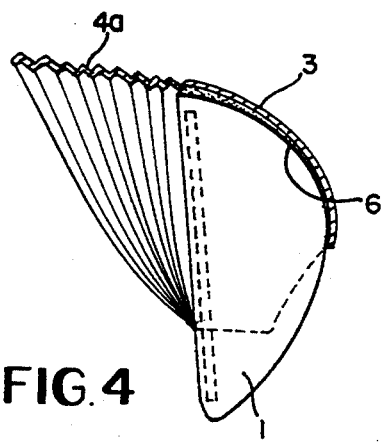
FIG. 4 is a sectional view of another embodiment of the water-repellant shield for an automobile side mirror according to the present invention.

Referring in detail to FIG. 4, there is illustrated an additional embodiment of a water-repellant shield in accordance with the present invention. The water-repellant cover 3 is attached to the side mirror body 1 by an adhesive 6. A second extension cover 4a extends from the water-repellant cover 3 and is of a corrugated configuration, so that it is easily and adjustably collapsed for protecting the side mirror 2 from water 9 such as rain. During a non-rainy day, the corrugated extension cover 4a can be collapsed.

Figure 5:
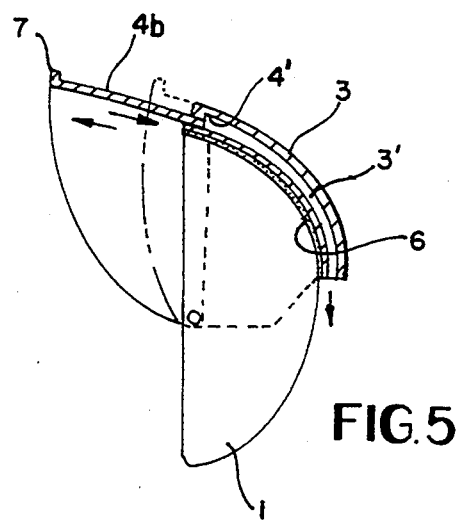
FIG. 5 is a sectional view of a third embodiment of the water-repellant shield for an automobile side mirror according to the present invention.

Referring in detail to FIG. 5, there is illustrated a third embodiment of a water-repellant shield or cover in accordance with the present invention. The water-repellant cover 3 is attached to the side mirror body by the adhesive 6. The water-repellant cover 3 includes a channel 3' for slidably receiving a third movable extension cover 4b. The movable extension cover 4b has a link 4' at one end and a stopper 7 disposed at the opposing end thereof for linking and stopping or handling the extension cover. During a non-rainy day, the third extension cover 4b is inserted into the channel 3'.

Figure 6:
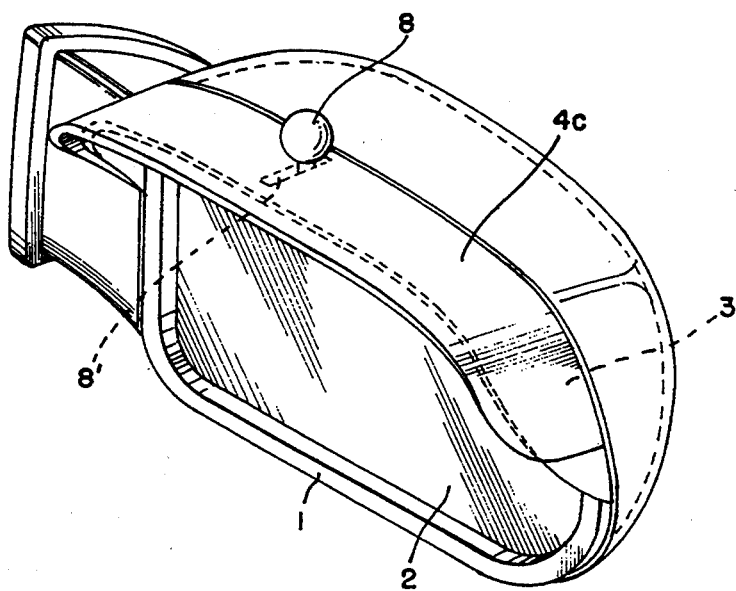
FIG. 6 is a perspective view of a fourth embodiment of the water-repellant shield for an automobile side mirror according to the present invention.
Figure 7:
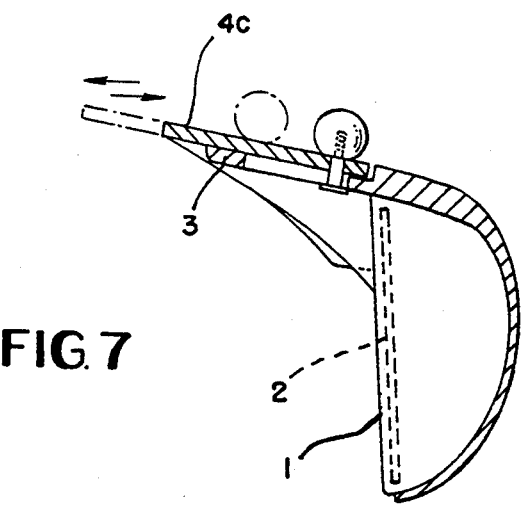
FIG. 7 is a cross-sectional view of the water-repellant shield for an automobile side mirror according to the present invention.

Also, referring in detail to FIGS. 6 and 7, there is illustrated fourth embodiment of a water-repellant shield or cover according to the present invention. The water-repellant cover 3 includes a slit 8' for smoothly moving a handle 8 therethrough so as to easily adjust the length of a fourth movable extension cover 4c. During a non-rainy day, the fourth extension cover 4c maintains an original position (FIG. 7).

The handle 8 may be either frictionally engaged with the surface of the extension cover or screwed down against a lower bolt member to fix the extension cover in its desired position.

Accordingly, the extension covers 4, 4a, 4b, and 4c made of resin or rubber can effectively protect the side mirror 2 from rain 9 and easily adjust the length thereof while it is a fine day.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A water-repellant shield for an automobile side mirror, said side mirror including an automobile side mirror body, and
   an automobile side mirror attached to said automobile side mirror body, said water-repellant shield comprising:
   a water-repellant cover separately provided from said automobile side mirror body for covering said automobile side mirror body and side mirror; and
   an extension cover member extending from said water-repellant cover for effectively protecting the automobile side mirror from water, wherein said extension cover member is movable for slidably inserting into a channel disposed in said water repellant cover, said extension cover having a link and a stopper for tightly linking or stopping positioning of said extension cover member and wherein said extension cover member is attached to said automobile side mirror body at neck portions thereof by a string or an adhesive.

2. The water-repellant shield for an automobile side mirror of claim 1, wherein said water-repellant cover and said extension cover are made of synthetic resin or synthetic rubber, respectively.

3. A water-repellant shield for an automobile side mirror, said side mirror including an automobile side mirror body, and an automobile side mirror attached to said automobile side mirror body, said water-repellant shield comprising:
   a water repellant cover separately provided from said automobile side mirror body for covering said automobile side mirror body and side mirror; and
   an extension cover member extending from said water-repellant cover for effectively protecting the automobile side mirror from water, wherein said extension cover member is attached to a handle, said handle being movable in a slit disposed in said water-repellant cover for easily adjusting the length of the extension cover member.

4. A water-repellant shield for an automobile side mirror, said side mirror including an automobile side mirror body and an automobile side mirror attached to said automobile side mirror body, said water-repellant shield comprising:
   a water-repellant cover separately provided from said automobile side mirror body for covering said automobile side mirror body and side mirror; and
   an extension cover member extending from said water-repellant cover for effectively protecting the automobile side mirror from rain water, wherein said extension cover member is a corrugated configuration for easily collapsing by itself.

5. The water-repellant shield for an automobile side mirror of claim 4, wherein said water-repellant cover and said extension cover are made of synthetic resin or synthetic rubber, respectively.

6. The water-repellant shield for an automobile side mirror of claim 4, wherein said extension cover member is attached to said automobile side mirror body at neck portions thereof by a string or an adhesive.

* * * * *